United States Patent [19]

Rydz

[11] 4,301,377
[45] Nov. 17, 1981

[54] MOVING SURFACE WATER DRIVEN POWER APPARATUS

[76] Inventor: Leon Rydz, 115 Webster Ave., Yonkers, N.Y. 10701

[21] Appl. No.: 99,872

[22] Filed: Dec. 3, 1979

[51] Int. Cl.³ .............................................. F03B 13/12
[52] U.S. Cl. ...................................... 290/43; 290/54; 416/85
[58] Field of Search ...................... 290/42, 43, 53, 54; 416/84–86, 9, 120, 197

[56] References Cited

U.S. PATENT DOCUMENTS

| 867,192 | 9/1907 | Dawson | 290/43 |
| 4,023,041 | 5/1977 | Chappell | 290/53 |
| 4,228,360 | 10/1980 | Navarro | 290/43 |

FOREIGN PATENT DOCUMENTS

| 521934 | 7/1921 | France | 416/85 |
| 701716 | 12/1953 | United Kingdom | 416/85 |

*Primary Examiner*—B. Dobeck
*Assistant Examiner*—W. E. Duncanson, Jr.
*Attorney, Agent, or Firm*—Curtis Ailes

[57] ABSTRACT

The power apparatus includes a plurality of paddle wheels arranged in tandem and intended to be positioned generally transverse to the direction of movement of water at the surface of a body of water, each of the paddle wheels having a plurality of cylindrically curved blades which are concave on the blade face to be engaged and pushed by the water. Belt-like means mechanically couple the paddle wheels together to a power utilization device.

22 Claims, 11 Drawing Figures

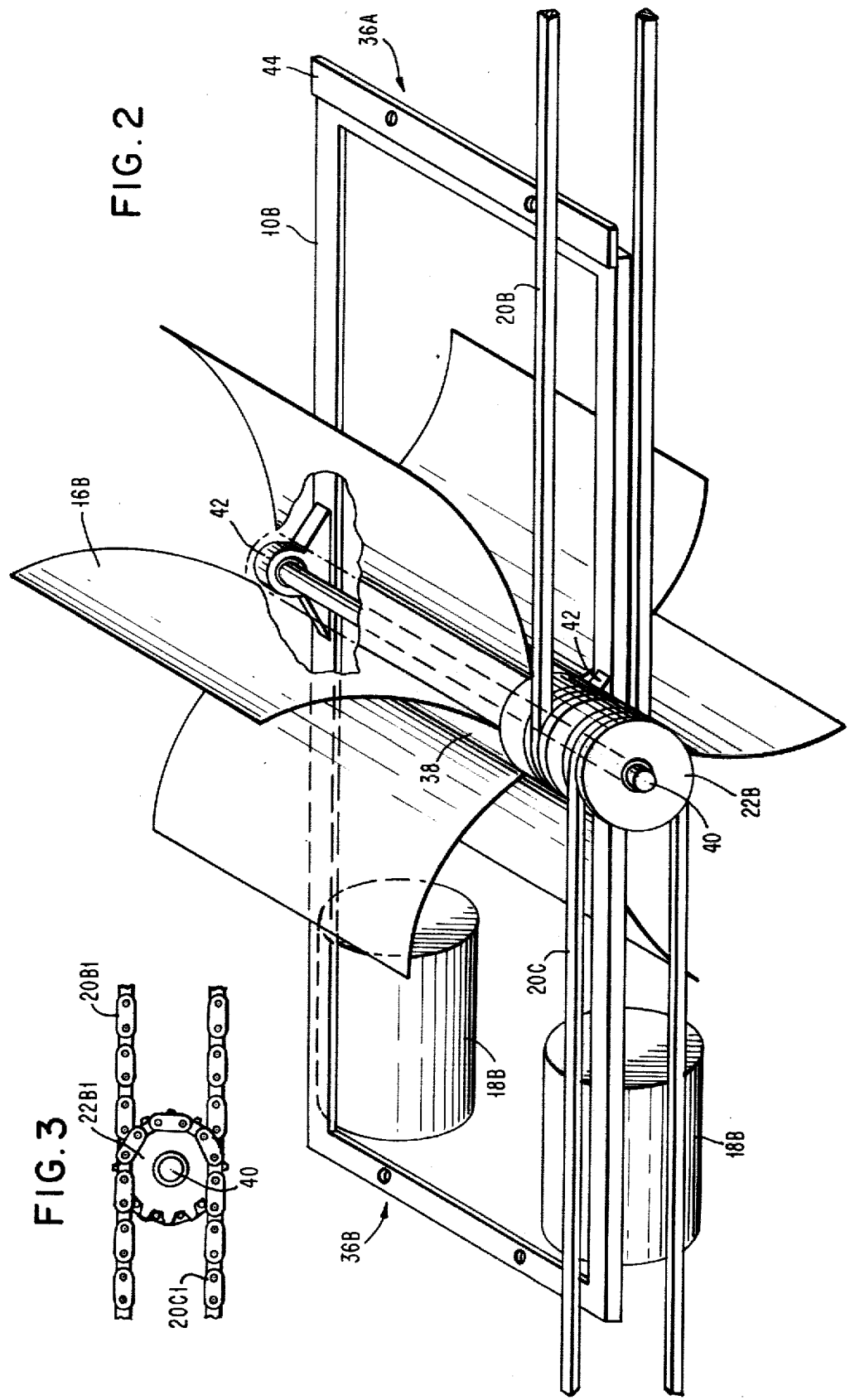
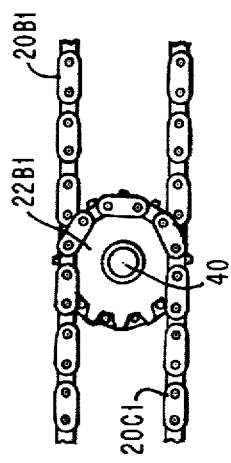

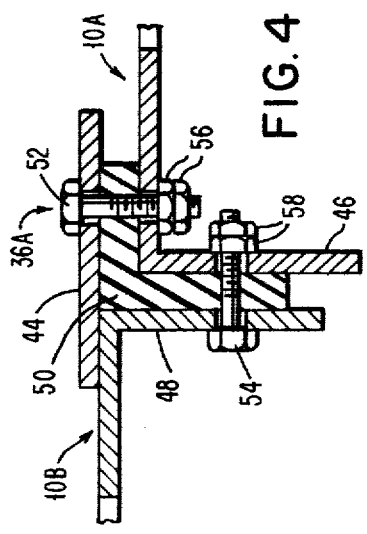
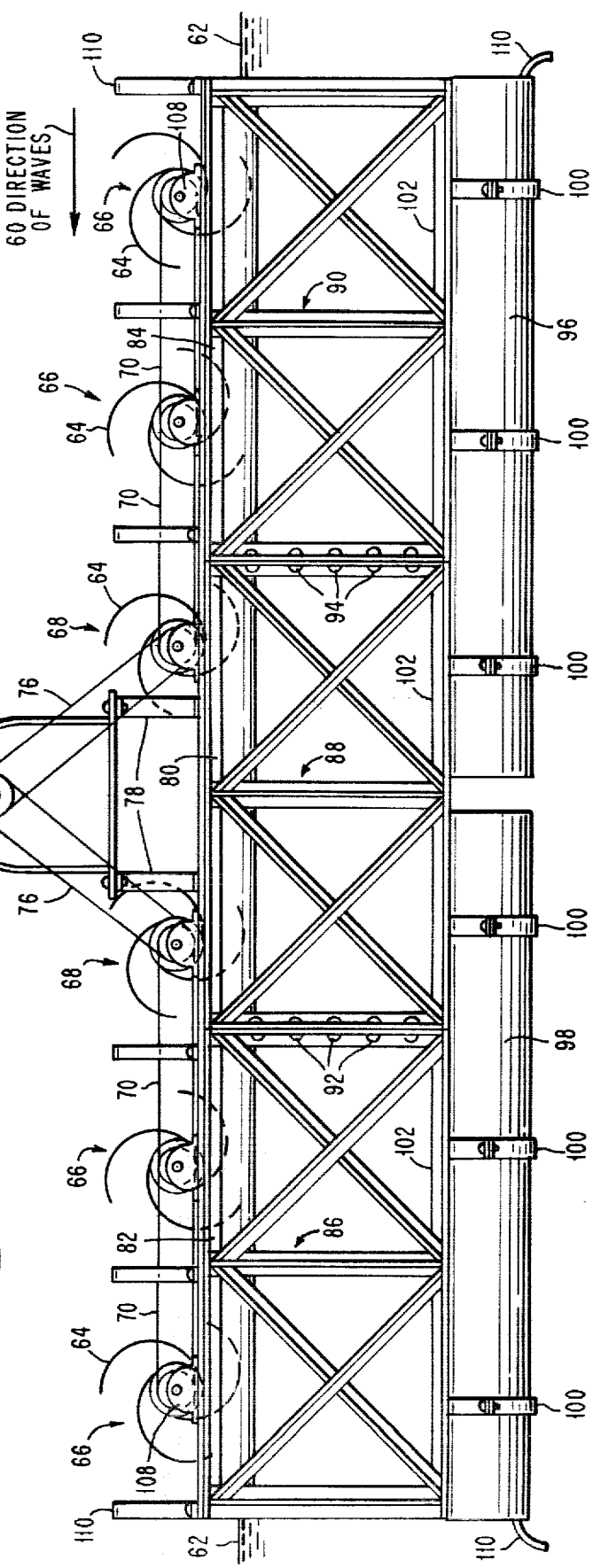

MOVING SURFACE WATER DRIVEN POWER APPARATUS

The invention relates generally to power apparatus for deriving power from moving water at the surface of a body of water, and is particularly useful for deriving power from water moving in a stream, or from waves at the surface of a large lake or sea.

It has now become a well known fact that the demand for energy is threatening to become greater than the supply of energy, and as a consequence, the cost of energy has greatly increased, and the supply of energy has become depleted in relation to the demand for energy.

Accordingly, it is one important object of the present invention to provide efficient energy recovery from a source not generally previously used, such as moving water at the surface of a body of water.

Various proposals have been made previously for the recovery of energy from moving water near the surface of a body of water, but such proposals have not been generally adopted, apparently because they have not been of sufficient merit and efficiency, and have not been sufficiently cost effective. For instance, U.S. Pat. No. 4,023,041 is issued to Walter L. Chappell discloses a very elaborate system for obtaining power from moving water which, so far as is known, has never been adopted or used.

Accordingly, it is an object of the present invention to provide an improved power apparatus for deriving power from moving water near the surface of a body of water which provides improved efficiency and improved cost effectiveness.

Other objects and advantages of the invention will be apparant from the following description and the accompanying drawings.

In carrying out the objects of the invention, there is provided an apparatus for deriving power from the movement of water at the surface of a body of water comprising a plurality of paddle wheels arranged in tandem and mutually parallel and to be positioned generally transverse to the direction of water movement, each of said paddle wheels having a plurality of cylindrically curved blades, a supporting means for supporting said paddle wheels for engagement by the lowermost blades with the water, the curvature of said blades being concave on the blade face to be engaged and pushed by the water, and belt-like means mechanically coupling said paddle wheels together and coupling said paddle wheels to a power utilization device.

In the accompanying drawings:

FIG. 2 is a perspective detail view of one of the frames and paddle wheels of the apparatus of FIG. 1.

FIG. 3 is a detail view illustration how roller chains and sprocket wheels may be substituted for belts and pulleys in the apparatus of FIGS. 1 and 2.

FIG. 4 is a sectional detail view illustrating the structure of a preferred form of resilient interconnection between adjacent frames in the apparatus of FIGS. 1 and 2.

FIG. 5 is a side view of a modification of the invention which is especially adapted for deriving power from waves.

Figure 7:
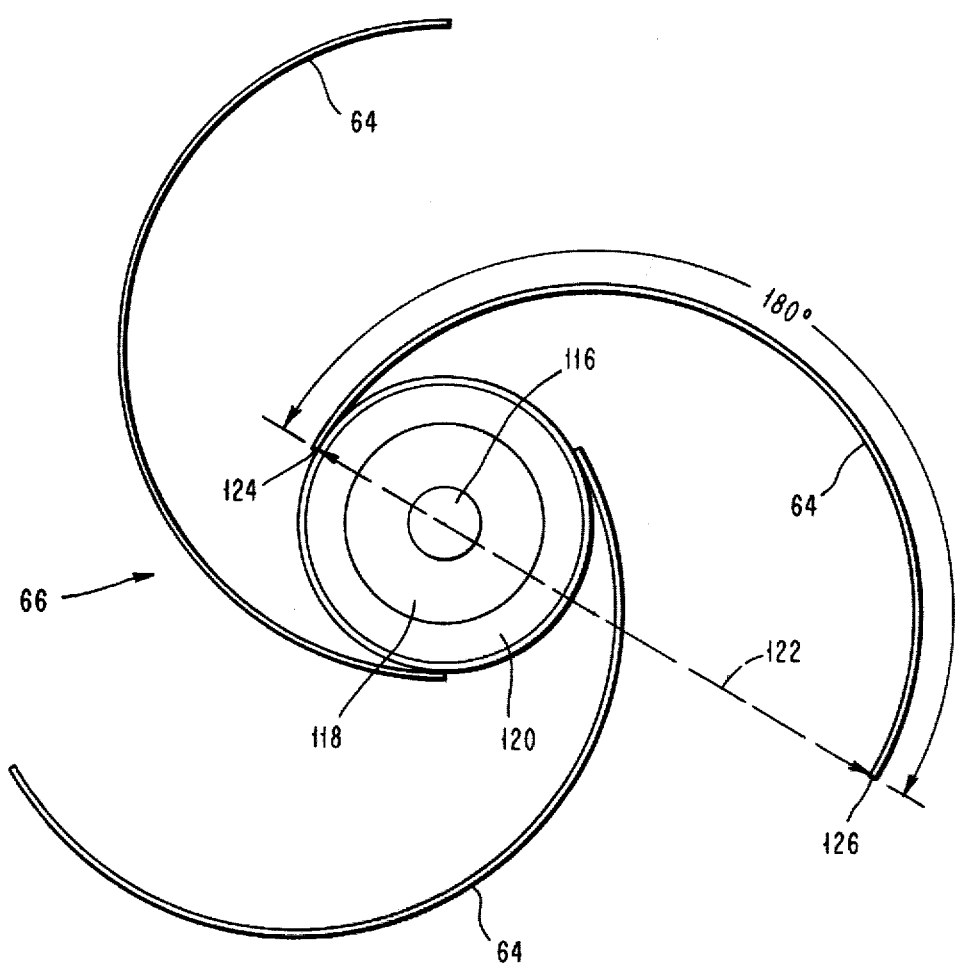
FIG. 7 is an enlarged detail end view of one of the paddle wheels 66 of the embodiment of FIGS. 5 and 6.
Figure 8:
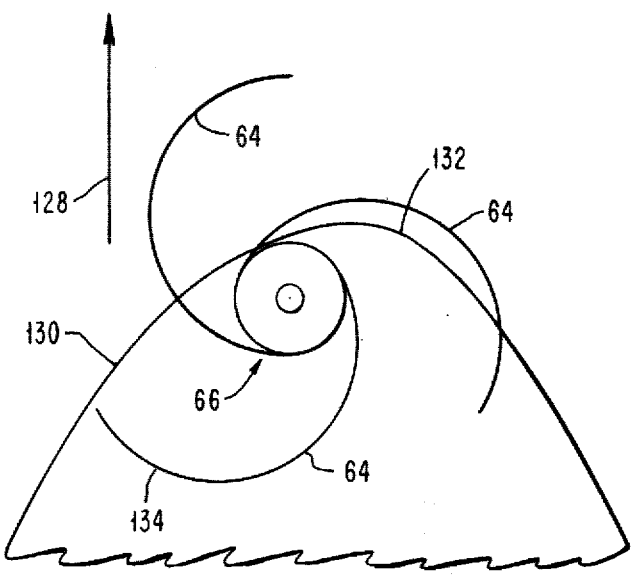
Figure 9:
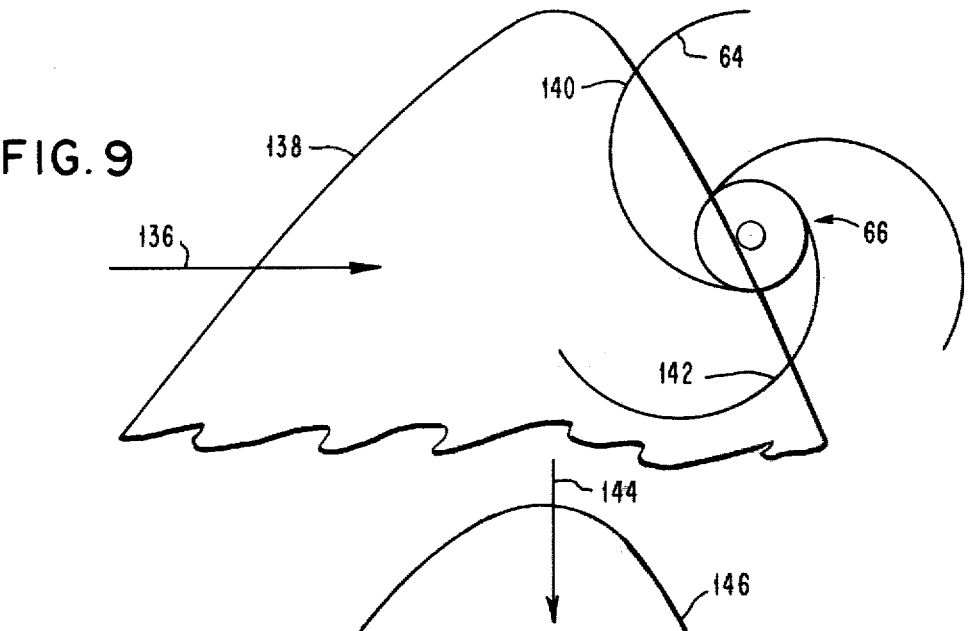
Figure 10:
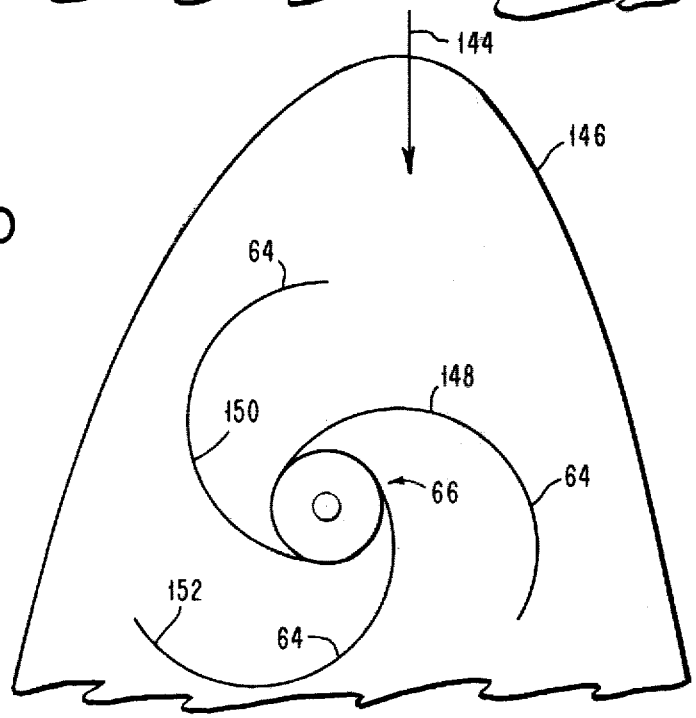

FIGS. 8, 9, and 10 illustrate modes of operation of the paddle wheel of FIG. 7 in which the waves attain high levels so as to wash completely over the entire paddle wheel structure.

Figure 11:
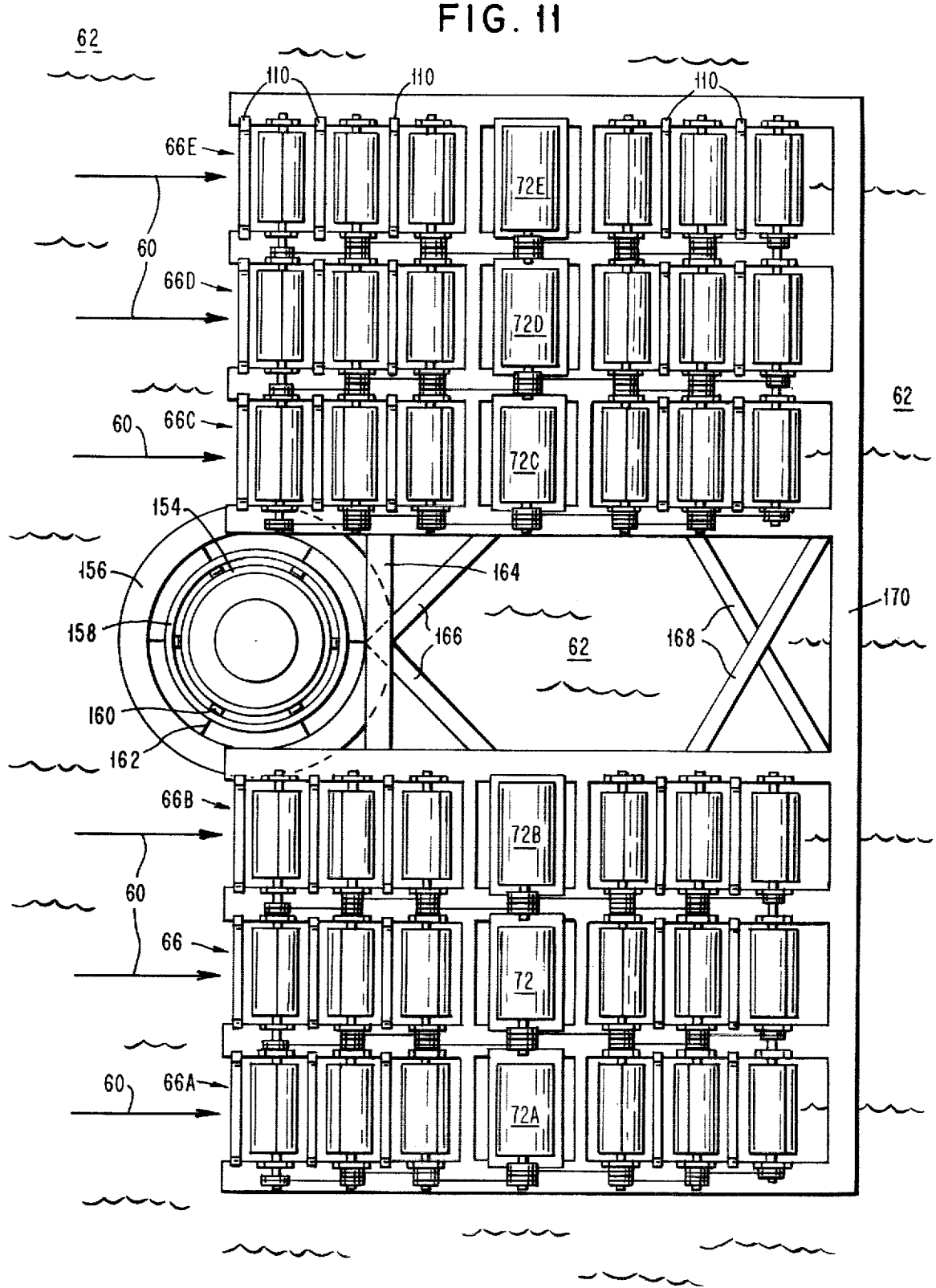

FIG. 11 is a top or plan view illustrating a combination of a plurality of apparatus assemblies in accordance with FIG. 5 and showing an anchoring means for the assemblage.

Figure 1:
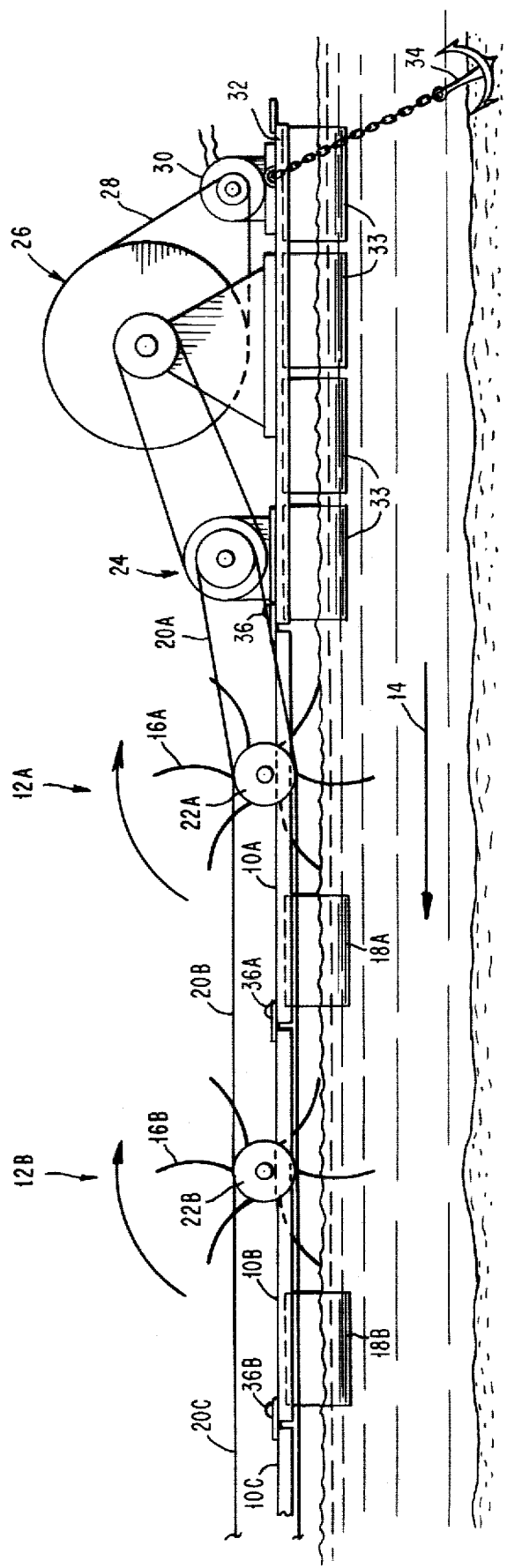
FIG. 1 is a side view illustrating the general arrangement of a first preferred embodiment of the invention which is especially designed to recover power from water moving in the surface of a stream.

Referring more particularly to FIG. 1, there is shown a side view of a preferred embodiment of the invention including a series of paddle wheels indicated generally at 12A and 12B which are arranged in tandem with one another and mutually parallel, and which are intended to be positioned generally transverse to the direction of water movement in a stream, as indicated by the arrow 14. Each of the paddle wheels 12A, 12B includes a plurality of cylindrically curved blades 16A, 16B. Supporting frames are provided for each of the paddle wheels 12A and 12B as indicated at 10A and 10B. While a single supporting frame, such as 10A, is shown for each paddle wheel such as 12A, it will be understood that more than one paddle wheel may be provided on each frame. The frames 10A, 10B, are each provided with individual flotation tanks at one end of the frame, as indicated at 18A, 18B. These flotation tanks support the paddle wheels 12A, 12B, for engagement by the lowermost blades 16A, 16B with the water in the stream for rotation by movement of the water. The curvature of the blades 16A, 16B is concave on the blade face to be pushed by the water. This arrangement has been found to be much more effecient in obtaining the maximum power from the water as compared to a straight blade.

The stream of water or body of water in which the apparatus is deployed may be a naturally occurring river or stream, or it may be a flume or an artificial water passage down an inclined ramp from the top of a structure such as a low dam, or between any two locations where water from a higher level is carried to a lower level.

The paddle wheels are connected together and coupled to a power utilization device by means of belts or chains indicated at 20A and 20B. For this purpose, each of the paddle wheels 12A, 12B includes preferably at least two pulley wheels or sprocket wheels indicated at 22A, 22B which are engaged by the belts or chains 20A, 20B.

The power utilization device may preferably comprise a series of speed-increasing pulley and shaft arrangements, indicated generally at 24 and 26, culminating in a belt drive 28 connected to drive a generator 30 to provide an electrical power output. The pulley and shaft arrangements 24 and 26 may include a variable speed transmission. The generator 30 and the pulley arrangements 24 and 26 are preferably supported upon a suitable barge 32 which is anchored in the stream, as indicated by the anchor shown at 34. The anchor chain is normally much longer than shown and is stretched out in a more nearly horizontal direction to hold more securely. As shown in the drawing, the flotation for the barge 32 is preferably provided by a series of drums 33 fastened to the bottom of the frame of the barge and arranged in two rows on opposite side edges of the barge, permitting a free flow of the current of the stream between the two rows of drums for maximum power realization by the paddle wheels.

The leading edge of frame 10A is securely attached, as indicated at 36, to the trailing edge of the barge 32. Similarly, the leading edge of frame 10B is securely attached, as indicated at 36A, to the trailing edge of frame 10A. In like manner, the leading edge of a third frame 10C (only partially shown) may be attached at 36B to the trailing edge of frame 10B. Thus, a long string of frames, each carrying an individual paddle wheel, may be attached and strung out downstream from a barge 32 to derive power from the movement of the water in the stream. It will be evident that as many frames and paddles as are needed may easily be added to the string in order to provide additional power.

The attachments at 36, 36A, 36B, etc. are preferably carried out in such a way as to permit small angular movements between adjacent frames, and between the barge 32 and frame 10A. A preferred attachement structure for accomplishing this purpose is illustrated in detail in FIG. 4 and described below in connecting with that drawing figure.

FIG. 2 is a persepctive detail view of just one of the frames and paddle wheels of the apparatus of FIG. 1 and showing additional details of construction. As shown in this drawing, one preferred construction for the belts 20B and 20C is a standard V-belt, and the associated pulleys 22B are standard V-belt pulleys. The paddle wheels, in addition to including curved blades 16B, also each include a large hub 38 to which the blades are attached, and a supporting axle 40 by means of which the paddle wheel is supported through bearing block brackets 42 upon the frame 10B. As illustrated further in FIG. 2, the flotation tanks 18B are laterally spaced apart to provide support at each of the rear corners of the frame 10B.

For establishing the connections 36A and 36B at the leading and trailing edges of the frame 10B, there may be provided simply bolt holes for the interconnections, at least two bolt holes being provided for each interconnection, as shown. The specific preferred structure of the interconnections 36A, 36B is shown in more detail in FIG. 4 and described below in connection with that figure.

FIG. 3 illustrates how roller chains 20B-1 and 20C-1 may be substituted for the V-belts 20B and 20C. In that case, as also illustrated in FIG. 3, a sprocket wheel 22B-1 is substituted for the pulley 22B. The use of chains and sprockets in place of belts and pulleys was previously mentioned in connection with FIG. 1. Each principal embodiment is disclosed with belts and pulleys, but it is understood that chains and sprockets could be used instead.

FIG. 4 is a sectional detail view illustrating the structure of a preferred form of one of the interconnections 36A between frames 10A and 10B. Each of the frames 10A and 10B is preferably fabricated from L-shaped section steel members 46 and 48. Attached at the upper surface of member 48 there is an auxiliary plate 44. The attachment between plate 44 and member 48 is preferably accomplished by welding so that plate 44 is integral with member 48 and provides an extension thereof. Enclosed in the space between the outer surfaces of L-shaped member 46 and the end surface of member 48 and the under surface of the extension member 44 there is provided an L-shaped rubber cushion member 50 to cushion the connections between the two frames 10A and 10B.

In order to secure the frames together, two bolts 52 and 54 are preferably provided which are mounted through openings in the rubber cushion 50 and through openings in the adjacent portions of the L-shaped member 46 and in the extension 44 and in the L-shaped member 48. The openings in the last-mentioned metal members are preferably substantially larger than the bodies of the bolts 52 and 54 so as to permit relative motion between the frames 10A and 10B through elastic deformation of the rubber cushion member 50. Each of the bolts 52 and 54 is preferably fastened by a combination of two nuts, as indicated at 56 and 58 which are locked together so as to be secure upon the bolt without having to be tightened down on the connections between the members 46, 48 and 44. Preferably, the nuts 56 and 58 are positioned so as to allow some lost motion in the connections between members 44 and 46 and between members 46 and 48 to permit greater freedom of movement.

As an alternative, if greater flexibility is required or desired in the joint, the bolt 54 may be completely omitted. However, the preferred embodiment is the embodiment shown employing both of the bolts 52 and 54.

The combination of the under surface of plate 44 and the outer surface of frame member 48 which are in contact with the rubber cushion 50 is sometimes referred to below as a concave L-shaped section. The outer surfaces of the L-shaped frame member 46 which are in contact with the rubber cushion 50 are sometimes referred to below as a convex L-shaped section. Also, the rubber cushion 50 is sometimes referred to below as being perforated since it includes openings to admit bolts 52 and 54.

FIG. 5 is a side view of a modification of the invention which is especially adapted for deriving power from water moving at the surface of a body of water in the form of waves, such as those encountered on an ocean, sea, or large lake. The apparatus is arranged with the blades curved in such a direction as to capture the energy from waves which are travelling to the left in the drawing as indicated by the arrow 60. While it is not anticipated that the water will ever be completely calm in a location in which wave power is to be captured by the apparatus, the water level for a calm sea in relation to the apparatus is indicated at 62. This may also be referred to as the mean water level. One of the main differences in the embodiment of FIG. 5 compared to the embodiment of FIG. 2 is that the blades 64 of the paddle wheels 66 and 68 are curved in a much larger arc, preferably an arc which is a full 180°, being a full semicircle. The reason for this is to provide a paddle wheel which is much more effective in capturing the power of the waves as will be described more fully below in connection with FIGS. 8, 9, and 10.

Each of the paddle wheels 66 and 68 again includes belt pulleys by means of which the individual paddle wheels are interconnected through belts 70. This embodiment of the invention also floats by means of flotation tanks shown in FIG. 5 and described below. The assembly is also anchored, but the anchoring means is not illustrated in FIG. 5.

At the center of the apparatus, there is provided a generator assembly 72 which is coupled by means of pulleys 74 and belts 76 to the most closely adjacent paddle wheels 68. The generator assembly 72 preferably includes a water-tight enclosure enclosing a train of gears or other shaft speed-increasing apparatus culminating in an electrical generator.

The train of gears within assembly 72 preferably comprises a variable speed transmission which can be controlled either remotely or automatically for the most efficient coupling of energy from the waves to the generator through the paddle wheels. This will generally mean a low generator speed for low wave power, and higher generator speed for higher wave power. The enclosure of the generator assembly 72 is preferably watertight to permit complete immersion, if necessary. However, as illustrate in FIG. 5, the generator assembly 72 is supported upon raised stanchions 78 so as to be above the usual level of the waves.

The generator assembly 72 is supported through the stanchions 78 upon frames including upper frames members 80, 82 and 84. The upper frame members 80, 82 and 84 comprise parts of three separate frame assemblies 86, 88, and 90 which are bolted together, as indicated at 92 and 94, to form a unitary frame structure.

Figure 6:
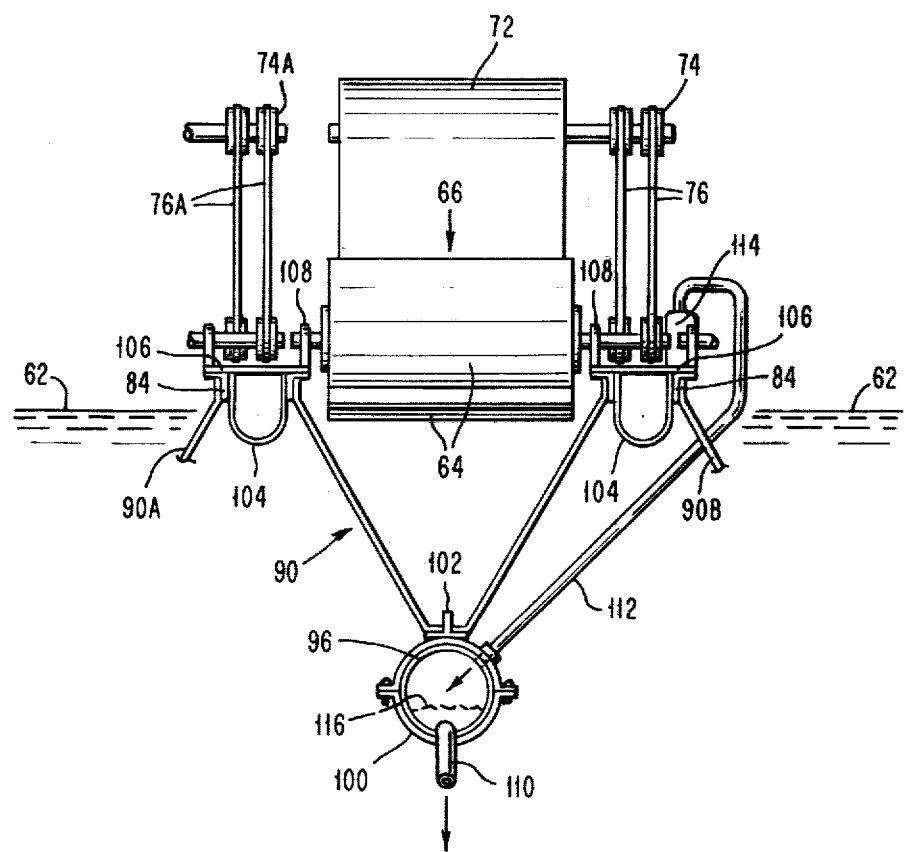
FIG. 6 is an end view of the apparatus of FIG. 5.

FIG. 6 is an end view of the apparatus of FIG. 5, and from that view it is apparent that the frame structure formed by the frame assemblies 86, 88, and 90 forms essentially a triangle with two relatively large flotation tanks 96 and 98 being attached to the frame at the bottom corner of the triangle, as shown in both FIG. 6 and FIG. 5. The tanks are attached to the frame by means of a series of clamps 100. The clamps 100 are attached to the bottom of the frames by means of a bottom frame rail 102, which is preferably a T-cross section beam. The clamps 100 are arranged so that they can be bolted closed to secure a tank, or opened to remove and replace a defective tank 96 or 98.

Another important feature of the structure as disclosed in FIGS. 5 and 6 is the provision of flotation in addition to the flotation provided by tanks 96 and 98 by auxiliary tanks 104 which are combined with the structure of the top frame rails 80-84. These tanks are positioned so as to be partially above and partially below the mean water level 62. Thus, the tanks 104 provide stabilizing flotation which keeps the apparatus in a state of flotation at the desired level with respect to the mean water level. The flotation tanks 104, and 96 and 98 serve as reinforcement members for the entire frame assembly. The tanks 104 are built into the upper rail structure which includes the rails 84 and a top plate 106, which closes off the tank 104, provides the support for the generator assembly 72 and for each of the paddle wheels 66 and 68. The paddle wheel supports are carried out by means of bearing block brackets 108.

While not shown in FIG. 6, upper cross-brace members are included, as shown at 110 in FIG. 5, which provide bracing between the top rails 84 and the upper flotation tanks 104 on opposite sides of the paddle wheels 66 and 68.

As indicated in FIG. 6, the apparatus of FIG. 5 and FIG. 6 is generally intended to be combined with similar apparatus assemblies which are placed side by side with the apparatus of FIGS. 5 and 6. The flotation provided by upper flotation tanks 104 is shared by adjacent assemblies, as are the upper side rail structures. This is indicated in FIG. 6 where frames 90A and 90B are shown only partially for the adjacent assemblies. Similarly, generator pulleys 74A and belts 76A are indicated in FIG. 6 for the adjacent assembly to the left of the assembly portrayed in FIG. 6.

Each of the main flotation tanks 96 and 98 is provided with means for interchanging the normal flotation medium, which is air, with water. By this means, the flotation can be adjusted to thereby adjust the height of the blades 64 of the paddle wheels 66 and 68 with respect to the mean water level to provide for optimum recovery of energy from the waves. For that purpose, as particularly shown in FIG. 6, there is provided an outlet pipe 110 at the bottom of each tank. While illustrated at the outer end of each tank, the outlet pipes 110 may be optionally provided in another position on the tank. The most important feature is that the outlet pipes 110 communicate with the lowermost portion of the interior of the tank. There is also provided an inlet pipe 112, particularly shown in FIG. 6, connected at the upper portion of the interior of the tank 96 (and 98) for supplying compressed air to the interior of the tank. Inlet pipe 112 is connected to an air control mechanism 114. Mechanism 114 may include an air compressor, and air control valves for controlling the level of air within the tanks 96 and 98. As illustrated in FIG. 6, tank 96 is not completely filled with air, since a water level is indicated at 116.

When greater flotation is desired, the control mechanism 114 is controlled in such a way as to energized the air compressor and appropriate valves to supply compressed air through the pipe 112 to increase the amount of air within tank 96 and to cause the displacement of some of the water in the bottom of the tank, discharging the water out of the tank through the outlet pipe 110. If less flotation is desired, a relief valve is opened in the control mechanism 114 to relieve and discharge air from the tank 96 through the inlet pipe 112, permitting water to rise through the discharge pipe 110 into the tank 96. By this means, the flotation of the apparatus can be very precisely controlled. Furthermore, if the necessity arises, the main flotation tanks 96-98 can be flooded with water, virtually eliminating any flotation effect, and permitting the entire apparatus to be sunk beneath the surface of the water. This procedure is particularly valuable during extremely stormy conditions, when the effect of the storm on the apparatus can be completely eliminated by sinking the apparatus. When the storm has subsided, the air compressor is again energized and the tanks are filled with air and the apparatus is caused to rise to the surface. For this operation, it is, of course, necessary for the air compressor to have an air inlet which is above the surface of the water even when the apparatus is sunk. The arrangements for accomplishing this are not illustrated in the drawing. Alternatively, tanks of compressed air can be provided for this purpose.

FIG. 7 is an enlarged end view detail of one of the paddle wheels 66 of FIG. 5 illustrating the preferred paddle curvature and mode of attachment of each of the paddles 64.

The paddle wheel is seen to include a central shaft 116, a pulley wheel 118, and an enlarged hub portion 120 (sometimes referred to herein as a drum). A dotted construction line has been added at 122 in the drawing which passes through the center of the drum shaft 116, and which intersects the ends of the blade 64 shown on the right. The construction line 122 represents a plane which is common to the two opposite edges of the blade 64 and extends through the axis of the hub. Thus, each blade 64 is attached to the enlarged hub portion 120 at the inside surface at one edge of the blade, generally at a point upon the hub substantially diametrically opposite from the outer edge of the blade, at 126. Furthermore, the angle of curvature of the blade from the inside edge 24 to the outside edge 126 is preferably 180°. While the paddle wheel may have as few as two blades, and perhaps more than three blades, the three-blade combination illlustrated in the drawing is preferred. This combination is believed to provide the most efficient capture of energy from the moving waves.

As previously described above, the normal mode of operation of the apparatus is intended to be carrried out while the level of the apparatus is maintained so that the waves generally pass beneath the enlarged hub 120, engaging and pushing upon the lowermost blade 64 of each paddle wheel in order to derive power from the movement of the waves. However, FIGS. 8, 9, and 10 illustrate modes of operation of the apparatus in which the waves attain higher levels, even washing completely over the entire paddle wheel structure. This may occur when the size of the waves increases suddenly.

Referring more particularly to FIG. 8, when the predominant movement of the wave is upwardly in relation to the rotor 66, as indicated by the arrow 128, and as indicated by the outline of the wave in section at 130, the rising front of the wave engages the concave surface of the righthand blade 64, as indicated at 132, in order to extract energy and to cause the rotor to rotate in the counterclockwise direction. Meanwhile, the water rising against the lowermost blade 64, as indicated at 134, engages the convex surface of that blade and does not exert as much turning effect on that blade, being deflected around the blade instead.

FIG. 9 illustrates the action of the wave upon the paddle wheel when the wave is high enough to virtually immerse the paddle wheel and when the wave direction is predominantly a forward direction, as indicated by the arrow 136 and the wave outline 138. Again, the wave is deflected over the convex upper surface of the uppermost blade 64 indicated at 140, but engages and turns the paddle wheel at the concave surface at the lowermost blade as indicated at 142.

FIG. 10 illustrates a similar action in which the predominant movement of the wave is downward or receding, as indicated by the arrow 144 and the wave outline 146. Here the water is deflecting at 148 over the convex outer surface of the right blade 64, and is working at the concave inner surfaces of the other blades at 150 and 152. Therefore, in each of the instances of FIGS. 8, 9, and 10, energy is derived from the water movement to cause rotation of the paddle wheel in a counterclockwise direction. Thus the paddle wheel of the present invention is very effective even if the level of the waves greately exceeds the anticipated level, and the paddle wheel is momentarily submerged by the waves.

FIG. 11 is a top or plan view illustrating how a plurality of apparatus assemblies of paddle wheels and generators such as described above in connection with FIGS. 5 and 6 can be combined and connected together side by side to form an assemblage of paddle wheels and generators. This entire assemblage is arranged to be connected to, and anchored by, a circular tower 154 which is built upon and thus secured to the sea bottom. The tower 154 may preferably provide the additional function of a lighthouse.

The attachment of the assemblage to the tower 154 is carried out by means of a circular frame 156 which is attached to, and forms a part of, the entire frame of the entire assemblage and which is positioned near the front of the assemblage in relation to the anticipated direction of waves which are to be intercepted by the apparatus, as indicated by the arrows 60. The circular frame 156, as illustrated in FIG. 11, surrounds the tower 154, but permits angular rotation of the assemblage about the tower to align the assemblage with the direction of wave movement, as indicated by the arrows 60. The actual attachment from the frame 156 to the tower 154 is preferably accomplished by means of an inner ring 158 carrying rollers 160 which engage the outer surface of the tower 154. The inner ring 158 is maintained in spaced relationship to the circular frame 156 by means of steel tension cables 162.

The assemblage preferably includes six apparatus assemblies of the type illustrated in FIGS. 5 and 6, all arranged mutually in parallel, and separated by the tower anchoring circular frame 156 and an associated central frame, with three assemblies arranged on each side of the circular frame 156. In addition to the frame 156, the centermost assemblies are maintained in a spaced apart relationship, and the cross connection is reinforced by cross-tying and bracing members 164, 166, and 168, as well as by a continuous frame member 170 extending across that space, and also tying the trailing end of all of the assemblies together.

For purposes of clarity, only the generators and the first paddle wheel in each assembly are specifically identified. However, the different assemblies are identified by appending different letter suffixes to the components of those different assemblies. Thus, the lowermost assembly in the drawing is identified by the suffix A and the generator is identified as 72A. The third assembly is identified by the suffix B, and so forth.

While not specifically illustrated in FIG. 11, the interconnections between adjacent assemblies, and between the center assemblies and the central frame, including the anchoring circular frame 156 and the braces 164-168 may be articulated, using connections includding rubber cushions and following the structure shown in FIG. 4 and described above in connection with that figure.

The cable connections 162 between the inner ring 158 and the outer anchoring ring 156 provide a flexibility and cushioning effect between the entire assemblage and the anchoring tower 154. Furthermore, the rollers 160 permit ease of adjustment in the vertical direction required by wave action and also required by the shifting of the tides. The rollers 160 at the front of the circular anchoring frame 156 will normally be in contact with the surface of the towers since the force on the whole assemblage will be from front to back. It is anticipated that the entire assemblage will rotate automatically to accommodate for changes in the direction of the waves. However, additional control means may be provided, if required, such as a suitable wind vane which can be controlled by the crew. It is anticipated that a crew will be provided for controlling the apparatus and that the crew will be housed in the tower where the operation of the apparatus can be observed. However, in most aspects, the operation of the apparatus is quite automatic, and it may be found to be possible to operate the apparatus without a crew in constant attendance.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. Apparatus for deriving power from the movement of water at the surface of a body of water comprising
   a plurality of paddle wheels arranged in tandem and mutually parallel and to be positioned generally transverse to the direction of water movement,
   each of said paddle wheels having a plurality of cylindrically curved blades,
   a supporting means for supporting said paddle wheels for engagement by the lowermost blades with the water,
   said supporting means including a plurality of floats operable to maintain the desired elevation of said paddle wheels by flotation of the entire apparatus,
   said floats comprising discrete flotation tanks,
   said supporting means comprising a plurality of separate support frames for said paddle wheels,
   each of said support frames having discrete flotation tanks,
   means for interconnecting said support frames to provide the tandem arrangement of said paddle wheels wherein said paddle wheels are arranged with substantially parallel axes,
   the curvature of said blades being concave on the blade face to be engaged and pushed by the water,
   and belt-like means mechanically coupling said paddle wheels together and coupling said paddle wheels to a power utilization device,
   said separate support frames being interconnected by articulated interconnections to permit at least limited relative angular movement between adjacent frames at the interconnections while the paddle wheels on adjacent frames are interconnected by said belt-like means.

2. Apparatus as claimed in claim 1 wherein
   said power utilization device is an electrical generator.

3. Apparatus as claimed in claim 2 wherein
   a plurality of said paddle wheels are arranged in tandem in front of said generator and a plurality of said paddle wheels are arranged in tandem in the rear of said generator in relation to the direction of water movement,
   all of said paddle wheels being coupled to said generator.

4. Apparatus as claimed in claim 3 wherein
   a plurality of assemblies of paddle wheels and generators are provided,
   each assembly including a plurality of paddle wheels arranged in tandem and mutually parellel and coupled to an electrical generator,
   said assemblies being connected together side by side to form an assemblage of paddle wheels and generators.

5. Apparatus as claimed in claim 4 wherein
   said assemblage is arranged to be connected to and anchored by a circular tower built up from the sea bottom.

6. Apparatus as claimed in claim 5 wherein
   an anchoring tower built upon the sea bottom is provided for said assemblage,
   said anchoring tower comprising a lighthouse.

7. Apparatus as claimed in claim 5 wherein
   said assemblage includes a circular frame member positioned near the front of said assemblage and arranged to surround the anchoring tower for connecting said assemblage to the tower while permitting angular rotation of said assemblage about the tower to align the assemblage with the direction of water movement.

8. Apparatus as claimed in claim 2 wherein
   a speed-changing means is coupled between said electrical generator and said belt-like means.

9. Apparatus as claimed in claim 8 wherein
   said speed-changing means comprises a variable speed transmission.

10. Apparatus as claimed in claim 1 wherein
    at least some of said discrete flotation tanks are arranged as a part of said apparatus intended to float near the surface of the water when the apparatus is in the operating elevation.

11. Apparatus as claimed in claim 1 wherein
    a separate support frame is provided for each of said paddle wheels.

12. Apparatus as claimed in claim 1 wherein
    said articulated interconnections comprise at least two bolts extending through openings in adjacent members of adjacent frames,
    and a perforated rubber cushion arranged upon each of said bolts and positioned between said adjacent frame members of said adjacent frames to accommodate for limited angular displacement between said adjacent frames at said interconnections.

13. Apparatus as claimed in claim 12 wherein
    said adjacent frame members of said adjacent frames include a concave L-shaped section on one of said frame members and a convex L-shaped section on the other of said frame members,
    and wherein said rubber cushion comprises an L-shaped rubber cushion,
    said rubber cushion being nested between said convex and concave sections of said frames and each of said bolts being connected between said adjacent frame members through registered openings in one leg of each of the L-shaped frame members and the L-shaped rubber cushion.

14. Apparatus as claimed in claim 13 wherein
    a second bolt is provided adjacent to each of said first mentioned bolts,
    said second bolt extending through the other leg of said rubber cushion and the associated portions of said convex and concave frame members.

15. Apparatus as claimed in claim 1 wherein
    said belt-like means comprises flexible belts.

16. Apparatus as claimed in claim 15 wherein
    said belts are V-belts.

17. Apparatus as claimed in claim 1 wherein
    said belt-like means comprises a plurality of chains,
    and each of said paddles includes at least one sprocket wheel on the paddle wheel axle engagable by at least one of said chains.

18. Apparatus for deriving power from the movement of water at the surface of a body of water comprising
    a plurality of paddle wheels arranged in tandem and mutually parallel and to be positioned generally tranverse to the direction of water movement,
    each of said paddle wheels having a plurality of cylindrically curved blades,
    a supporting means for supporting said paddle wheels for engagement by the lower most blades with the water,
    said supporting means including a plurality of floats operable to maintain the desired elevation of said paddle wheels by flotation of the entire apparatus,
    said floats comprising discrete flotation tanks, said discrete flotation tanks comprising tanks connected and arranged within said apparatus at a level substantially below the water level upon said apparatus when said apparatus is in a working elevation, the curvature of said blades being concave on the blade face to be engaged and pushed by the water, and belt-like means mechanically coupling said paddle wheels together and coupling said paddle wheels to a power utilization device.

19. Apparatus as claimed in claim 18 wherein
said discrete flotation tanks include at least some flotation tanks positioned within said apparatus to extend both above and below the elevation of the water level within said apparatus at the working elevation in order to stabilize the vertical positioning of said apparatus at the working elevation.

20. Apparatus as claimed in claim 18 wherein
said discrete flotation tanks are each provided with a drain opening in the bottom portion thereof and with a filler opening in the upper portion thereof, and wherein there is provided a means for controlling the level of air within said flotation tanks comprising a means for filling said tanks with compressed air through said filler openings in order to increase the flotation of each tank and to thus raise the level at which said apparatus floats upon the water, and said means for controlling the level of air also including means for releasing air from said tanks through said filler openings to reduce the flotation of said apparatus to lower the level of flotation by permitting water to enter said tank through said drain openings.

21. Apparatus as claimed in claim 20 wherein
said means for controlling the level of air within said flotation tanks is operable to reduce the amount of air in said flotation tanks sufficiently to cause the entire apparatus to sink below the water surface for protection of said apparatus from storm damage.

22. Apparatus for deriving power from the movement of water at the surface of a body of water comprising a plurality of paddle wheels arranged in tandem and mutually parallel and to be positioned generally transverse to the direction of water movement, each of said paddle wheels having a plurality of cylindrically curved blades, a supporting means for supporting said paddle wheels for engagement by the lowermost blades with the water, the curvature of said blades being concave on the blade face to be engaged and pushed by the water, the cylindrical curvature of each of said curved blades being substantially circular, the curvature of each blade being formed in a curve extending over an angle of substantially 180° and up to three blades being provided on each paddle wheel, each of said paddle wheels including an enlarged hub portion and each blade being attached to said enlarged hub portion at the inside surface at one edge of said blade at a position upon said hub portion substantially diametrically opposite from the outer edge of said blade, said blade being arranged and positioned and attached to said enlarged hub in a position such that the plane which is common to the two opposite edges of said blade extends through the axis of said hub portion, and belt-like means mechanically coupling said paddle wheels together and coupling said paddle wheels to a power utilization device.

* * * * *